United States Patent [19]

Ohno et al.

[11] Patent Number: 4,890,583

[45] Date of Patent: Jan. 2, 1990

[54] CRANKCASE OF AN ENGINE

[75] Inventors: Katsuhiko Ohno; Keisuke Ishii; Motoaki Etoh, all of Tokyo, Japan

[73] Assignee: Fuji Jukogyo Kabushiki Kaisha, Tokyo, Japan

[21] Appl. No.: 287,889

[22] Filed: Dec. 20, 1988

[30] Foreign Application Priority Data

Dec. 28, 1987 [JP] Japan .............................. 62-200305

[51] Int. Cl.$^4$ .............................................. F01P 1/02
[52] U.S. Cl. ................................. 123/41.7; 123/41.65; 123/195 C
[58] Field of Search ............... 123/41.56, 41.60, 41.62, 123/41.65, 41.7, 195 C, 196 AB, 198 E

[56] References Cited

U.S. PATENT DOCUMENTS

| | | | |
|---|---|---|---|
| 3,530,840 | 9/1970 | Freyn | 123/41.7 |
| 3,693,602 | 9/1972 | Thien et al. | 123/41.7 |
| 4,213,440 | 7/1980 | Abe et al. | 123/195 C |
| 4,261,302 | 4/1981 | Sheldon | 123/41.7 |

*Primary Examiner*—Noah P. Kamen
*Attorney, Agent, or Firm*—Beveridge, DeGrandi & Weilacher

[57] ABSTRACT

An engine of forced air cooled type which is provided with a cooling fan fixedly mounted on an end of a crankshaft within a blower housing of the fan, and which has a plurality of meshed gears. The crankcase constitutes the lower part of the outer structure of the engine to enclose the gears and has a double-wall construction with cooling air passages thus formed therein in at least the part thereof enclosing the gears. The cooling air passages have upstream ends communicating with the delivery outlet of the blower housing and downstream ends positioned to direct cooling air against and along the outer surface of the crankcase.

7 Claims, 2 Drawing Sheets

CRANKCASE OF AN ENGINE

BACKGROUND OF THE INVENTION

This invention generally relates to engines having crankcases enclosing moving parts lubricated and cooled by lubricating oil. More particularly the invention relates to an engine crankcase in which the cooling performance of the lubricating oil is improved, and at the same time leakage of gear meshing noise to the outside is prevented.

As is known, moving parts requiring lubrication such as meshed gear parts assembled within an engine are so constructed and arranged as to be lubricated and cooled by a lubricating oil which is circulated in the engine, and this lubricating oil absorbs heat from these parts requiring lubrication, whereby its temperature rises.

When the temperature of this lubricating oil rises excessively, the oil viscosity decreases, and the oil-film-forming capability of the lubricating oil drops, whereby not only does it become difficult to obtain good lubrication, but this causes deterioration of the oil.

A number of measures intended to overcome this difficulty have been proposed. For example, Japanese Utility Model Laid-Open Publication No. 46940/1979 discloses a technique which comprises providing baffle plates on the outer side of the crankcase and directing at least a portion of the cooling air draft propelled by the cooling fan to flow down along the outer surface of the crankcase thereby to accomplish cooling of the lubricating oil within the crank chamber through the crankcase.

This technique of the prior art, however, requires the troublesome work of installing the baffle plates and entails an increase in labor cost.

Within an engine crank chamber, in general, a plurality of gears such as cam gears and balancer gears are assembled in meshed state and emit meshing noise as the engine operates. However, with respect to this gear meshing noise, no serious countermeasure has heretofore been taken as far as we are aware.

SUMMARY OF THE INVENTION

An object of this invention, which has been made in view of the above described circumstances of the prior art, is to provide an engine crankcase in which the lubricating oil within the crank chamber can be cooled without increase in production cost, and the meshing noise of the gears operating within the crank chamber is effectively prevented from leaking out of the crankcase.

According to this invention there is provided a crankcase of an engine of forced air cooled type which is provided with a cooling fan fixedly mounted on an end of a crankshaft within a blower housing of said fan, and which has a plurality of meshed gears. The crankcase constitutes the lower part of the outer structure of the engine to enclose the gears and has a double-wall construction with cooling air passages thus formed therein in at least the part thereof enclosing the gears. The cooling air passages have upstream ends communicating with the outlet of the blower housing and downstream ends positioned to direct cooling air against and along the outer surface of the crankcase.

The nature, utility, and further features of this invention will be understood from the following detailed description with respect to a preferred embodiment of the invention when read in conjunction with the accompanying drawings, briefly described below.

DETAILED DESCRIPTION OF THE INVENTION

Figure 1:
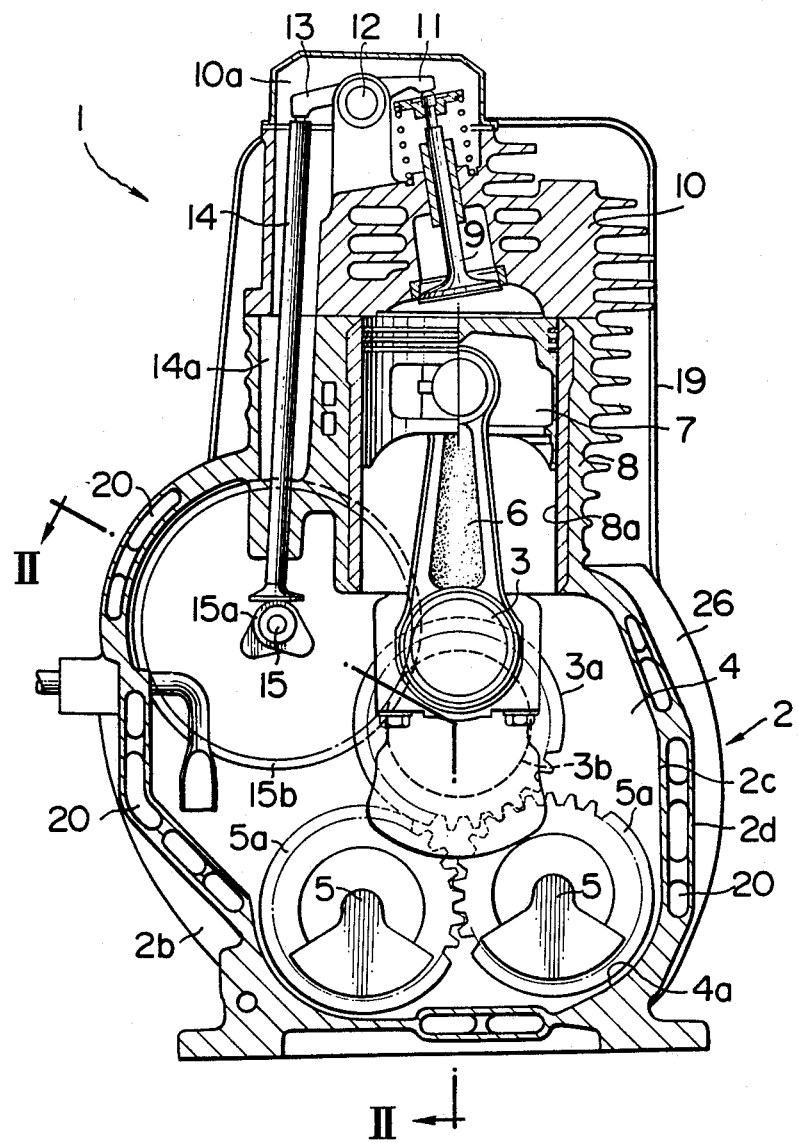
FIG. 1 is an end elevation, in vertical section, of an engine in which one example of the crankcase according to this invention is used.
Figure 2:
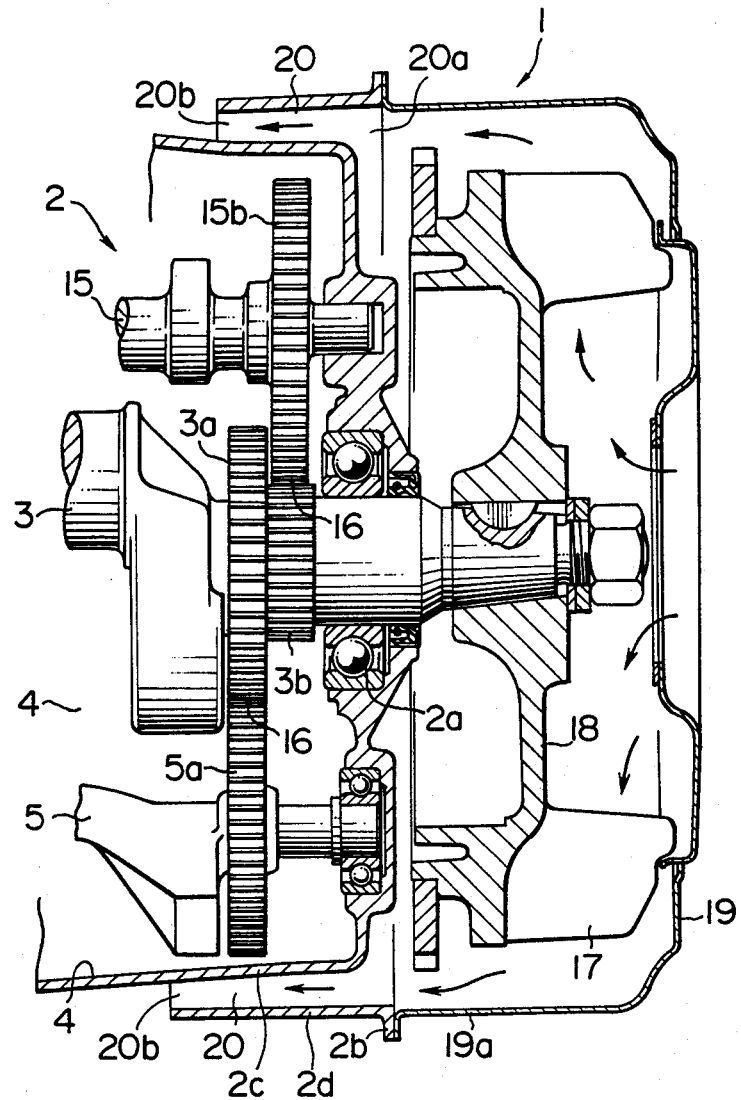
FIG. 2 is a section taken along a dihedral surface indicated by the bent line II—II in FIG. 1 as viewed in the arrow direction.

Referring to the drawings, the engine illustrated therein has an engine main structure 1 having a crankcase 2 constituting the bottom part thereof and enclosing a crank chamber 4 and an oil pan 4a at the bottom for serving as a reservoir for a specific quantity of lubricating oil.

Within the crank chamber 4, a crankshaft 3, which is one example of a rotary shaft, is rotatably supported by main bearings 2a fixedly supported by the crankcase 2. In addition, within this crank chamber 4 are rotatably supported a plurality of balancer shafts 5 and a camshaft 15.

A plurality of crank gears 3a, 3b are coaxially fixed to the crankshaft 3 and are respectively meshed with a balancer gear 5a fixed to a balancer shaft 5 and with a cam gear 15b fixed to the camshaft 15. The region wherein the crank gear 3a and the balancer gear 5a mesh and the region wherein the other crank gear 3b and the cam gear 15b mesh constitute meshing parts 16. When the engine operates, the camshaft 15 and the balancer shaft 5 are rotated by way of these crank gears 3a and 3b. During the operation of the engine, an oil pump (not shown) is operated to pump lubricating oil stored in the oil pan 4a to the moving parts requiring lubrication of the engine.

As in a conventional engine, a cylinder block 8 is integrally formed with the crankcase 2 and fixedly accommodates a cylinder 8a in which a piston 7 is slidably fitted. The piston 7 is coupled via a wrist pin and a connecting rod 6 to the crankshaft 3. The cylinder block 8 is capped by a cylinder head 10 fixed thereto and slidably holding intake/exhaust valves 9. A rocker chamber 10a is formed on the upper part of the cylinder block 10 and accommodates a valve actuating mechanism 11 for opening and closing the intake/exhaust valves 9.

The valve actuating mechanism 11 comprises essentially a rocker shaft 12, rocker arms 13 pivotally supported on the rocker shaft 12, and push rods 14. The rocker arms 13 are rocked by the upper ends of the push rods 14 and thus open and close the intake/exhaust valves 9. The push rods 14 are slidably accommodated within a push-rod chamber 14a serving doubly as an oil return passage. The lower ends of the push rods 14 extend downward into the crank chamber 4 and are in slidably abutting contact with cam lobes 15a of the camshaft 15 rotated by the crankshaft 3, whereby the rotation of the camshaft 15 causes the push rods 14 to undergo axial reciprocating motion to rock the rocker arms 13.

The interior of the rocker chamber 10a and the parts therein are adapted to be lubricated by lubricating oil forcibly introduced thereinto by an oil pump. The lubricating oil which has thus lubricated the rocker chamber 10a passes through the push-rod chamber 14a and is returned into the crank chamber 4.

One end of the crankshaft 3 extends outward from the crankcase 2. On this end of the crankshaft 3 thus projecting outward is fixedly mounted a flywheel 18 having a cooling fan 17 on its outer side. This flywheel 18 and its cooling fan 17 are enclosed within a blower housing 19 having a partially cylindrical peripheral part 19a which is fixed to a flange or rib 2b formed around a peripheral part of the crankcase 2. At this part, the crankcase 2 is of double-wall construction comprising an inner wall 2c and an outer wall 2d provided with the flange or rib 2b. Cooling air passages 20 are formed between the outer wall 2d and the inner wall 2c. The blower housing 19 at its upper side is extended toward the cylinder block 8 and the cylinder head 10 so that a cooling air stream propelled by the cooling fan 17 is directed toward the crankcase 2, the cylinder block 8, and the cylinder head 10.

The upstream ends 20a of the above mentioned air passages 20 communicate with the interior of the blower housing 19 at the outlet part thereof. The downstream ends 20b of these air passages 20 open out around the outer periphery of the crankcase 2. Thus, one portion of the cooling air stream produced by the cooling fan 17 is caused to flow through these air passages 20 and absorbs heat from the crankcase 2, whereby the crankcase 2 and the oil pan 4a are cooled.

The crankcase according to this invention of the above described construction functions in the following manner in conjunction with the operation of the engine.

When the engine is operated, the crankshaft 3 rotates to cause rotation via the crank gears 3a and 3b of the balancer shafts 5 and the camshaft 15. Accordingly, the cam lobes 15a, the push rods 14, the rocker arms 13 pivotally supported on the rocker shaft 12, and the intake/exhaust valves operate in the known manner. At the same time, as the camshaft 15 rotates, the operations of an oil pump (not shown), the balancer gears 5a, and other parts cause the lubricating oil in the oil pan 4a to be distributed by splashing and thus supplied to parts requiring lubrication. The lubricating oil thereafter flows through the push-rod chamber 14a constituting a part of the oil return passage means and along the inner wall surface of the crankcase 2 and other parts to return into the oil pan 4a.

As the engine operation continues, the circulating lubricating oil absorbs heat generated by friction and other causes in the parts requiring lubrication, whereby its temperature gradually rises. At the same time, the heat thus absorbed by the lubricating oil is transferred to the crankcase 2, the temperature of which also rises.

However, air spaces 20 are formed around the exterior parts of the crankcase 2 and increase the effective outer surface area of the crankcase 2, that is, the surface cooling area, whereby the rise in temperature of the crankcase 2 is effectively suppressed.

At the same time, a portion of the cooling air stream propelled by the cooling fan 17 formed on the flywheel 18 rotating in unison with the crankshaft 3 is directed by the peripheral part 19a of the blower housing 19 into the air spaces 20 and thus flows along the outer wall surface of the crankcase 2. As a result, the crankcase 2 is further cooled by this cooling air stream, and, through this cooled crankcase 2, the lubricating oil circulating therewithin is cooled.

The cooling air stream after flowing through the air spaces 20 flows out through the downstream ends 20b formed around the crankcase 2 and flows further along the outer wall surface of the crankcase 2, thereby further cooling the same.

Furthermore, as the engine operates, engine noises such as meshing noise accompanying the movements of parts such as the crank gears 3a and 3b and the balancer gears are being emitted and naturally tend to escape outward through the crankcase 2. However, since the crankcase according to this invention is provided therearound with the outer wall 2d and the air spaces 20, these air spaces serve as noise insulation which effectively suppresses the leakage of this noise to the outside.

While the invention has been described above with respect to only one example thereof, it is not intended to be limited to the details thus described. For example, while the air spaces 20 are described above as being formed around only the crankcase, they may be provided also in and/or around the main bearing covers.

Furthermore, while the above described example illustrates a case wherein the crankcase of this invention is used in an engine of OHV type of horizontal form, this invention is not limited to this example but can be applied with equal effectiveness to engines of other types and forms such as, for example, engines of vertical form or OHC type.

As described above, this invention provides an engine crankcase including parts functioning partially as a lubricating oil cooling system which not only cools the lubricating oil circulating through the crankcase but also prevents leakage of gear noise and other engine noise to the outside.

Furthermore, because of the construction of the crankcase including an integral part forming the cooling air passages, the mechanical strength of the crankcase is increased as an additional advantageous feature.

What is claimed is:

1. A crankcase of an engine of forced air cooled type which is provided with a cooling fan fixedly mounted on an end of a crankshaft within a blower housing of said fan, and which has a plurality of meshed gears, said crankcase constituting the lower part of an outer structure of the engine to enclose said gears and having a double-wall construction with cooling air passages thus formed therein in at least the part thereof enclosing said gears, said cooling air passages having upstream ends communicating with an outlet of said blower housing and downstream ends positioned to direct cooling air against and along the outer surface of the crankcase.

2. The crankcase according to claim 1 wherein said plurality of meshed gears are crank gears coaxially fixed to the crankshaft, a balancer gear fixed to a balancer shaft and a cam gear fixed to the camshaft.

3. The crankcase according to claim 1 further comprising a cylinder block and a cylinder head mounted on the cylinder block.

4. The crankcase according to claim 3 wherein said blower housing has an upper side and a lower side and is extended toward the cylinder block and the cylinder head at its upper side, so that a cooling stream propelled by the cooling fan is directed toward the crankcase, cylinder block and cylinder head.

5. The crankcase according to claim 1 wherein said crankcase has two side walls and a bottom wall.

6. The crankcase according to claim 5 wherein said cooling air passage is in at least two of said walls.

7. The crankcase according to claim 5 wherein said cooling air passage is in said two side walls and bottom wall.

* * * * *